Dec. 11, 1923.                                                   1,476,835
H. W. PLEISTER
NAIL EXPANSION
Filed Oct. 22, 1921      2 Sheets-Sheet 1
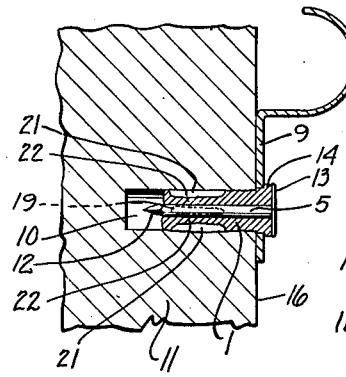
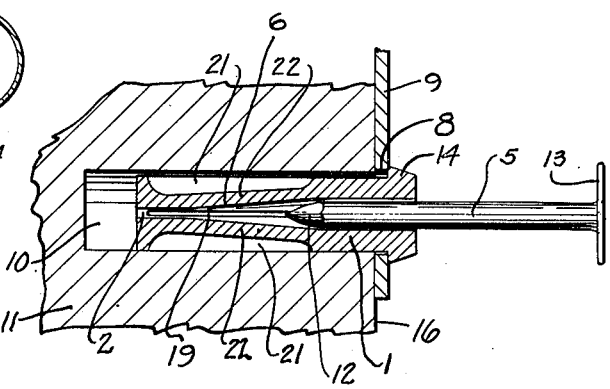
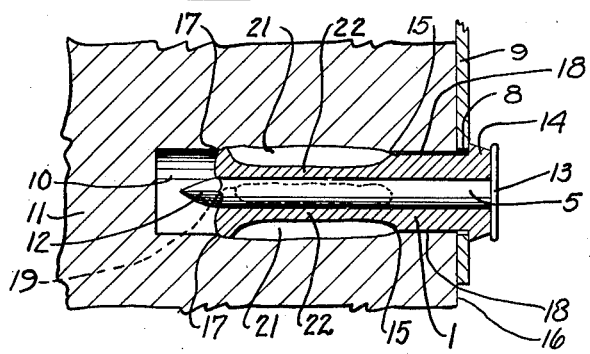
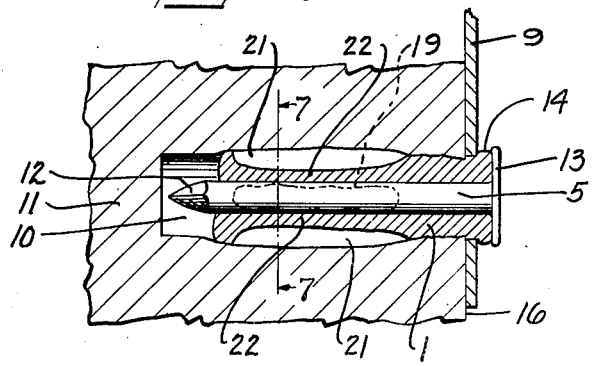
INVENTOR
Henry W. Pleister
BY
Alan M. Johnson
ATTORNEY Dec. 11, 1923.
H. W. PLEISTER
NAIL EXPANSION
Filed Oct. 22, 1921   2 Sheets-Sheet 2
1,476,835
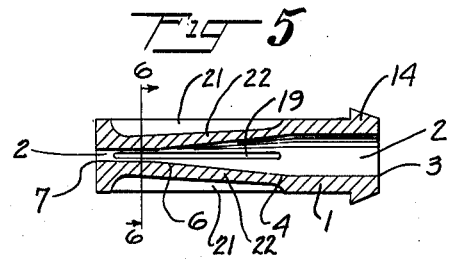
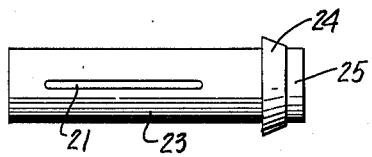
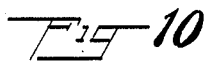
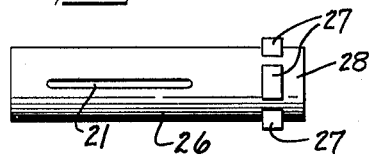
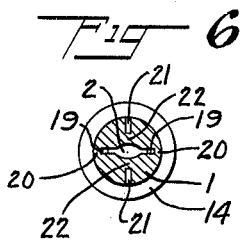
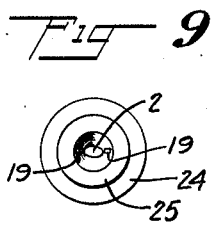
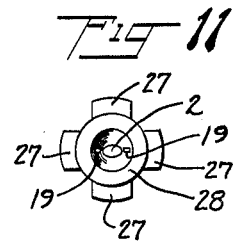
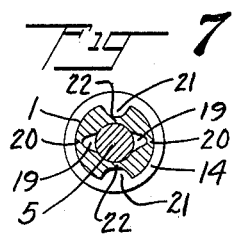
INVENTOR
Henry W. Pleister
BY
Alan W. Johnson
ATTORNEY Patented Dec. 11, 1923.

1,476,835

UNITED STATES PATENT OFFICE.

HENRY W. PLEISTER, OF WESTFIELD, NEW JERSEY, ASSIGNOR TO HENRY B. NEWHALL.

NAIL EXPANSION.

Application filed October 22, 1921. Serial No. 509,611.

*To all whom it may concern:*

Be it known that I, HENRY W. PLEISTER, a citizen of the United States, residing at Westfield, in the county of Union and State of New Jersey, have made certain new and useful Improvements in Nail Expansions, of which the following is a specification, taken in connection with the accompanying drawings.

This application covers a species of the genus covered by my generic application Ser. No. 509,609, filed herewith.

My invention relates to nail expansions in which by merely driving the nail into the expansion the work is secured to the wall or other suitable support.

My invention more particularly relates to protecting the nail from moisture so that it will not rust materially in the expansion, thereby lengthening the life of the fastening.

My invention further relates to a combined nail expansion and plug. Further to a nail expansion which is provided with two sets of expanding means, one operated by the point, or forward end of the nail, and the other operated by the head of the nail.

My invention further relates to a ductile anchor or body member provided with a closed axial bore, extending throughout its length, having different diameters, and provided with interior and exterior radial grooves staggered with relation to each other and not permitting moisture to work into the axial bore to rust the nail.

My invention further includes an anchor provided with one or more stops, and a ductile member or flange which is compressed by the head of the nail as the nail is driven home.

My invention further relates to certain combinations, sub-combinations, articles of manufacture, and details of construction, all of which will be more fully hereinafter described and pointed out in the claims.

In the drawings I have shown different embodiments of my invention but it is of course to be understood that my invention is not to be confined to the embodiments shown by way of illustration.

Fig. 1 is a vertical section of one form of my invention;

Fig. 2 is a vertical section on an enlarged scale showing the parts in their first securing position;

Fig. 3 is a vertical section, the same as Fig. 2, showing the nail driven in until its head contacts with the ductile washer of the anchor or body member;

Fig. 4 is a vertical section, similar to Figs. 1 and 2, showing the next and final step of attaching the work to the wall or other suitable support;

Fig. 5 is a vertical section of the ductile anchor or body member shown in Figs. 1 to 4, inclusive;

Fig. 6 is a vertical section on the line 6—6 of Fig. 5;

Fig. 7 is a cross-section on the line 7—7 of Fig. 4;

Fig. 8 is a side elevation of a modified form of my invention;

Fig. 9 is an end elevation of the form shown in Fig. 8;

Fig. 10 is a side elevation of another form of my invention;

Fig. 11 is an end elevation of the modification shown in Fig. 10.

In the form of nail expansions now in use moisture readily works its way into the axial bore of the expansion, usually through slots, and also through the end of the expansion exposed to the weather. This results in water attacking the iron nail and in a comparatively short time rusting it to such an extent as to cause the work to rattle, and in some instances to fall. It is customary to employ iron nails which are galvanized, but this galvanizing only protects the iron of the nail for a comparatively short time, when the moisture will begin to rust the nail. In some instances iron anchors are used which are also galvanized. This galvanizing, however, only protects the iron anchor for a limited time when it, as well as the nail will rust. If this corroding or rusting is not prevented, serious results will in time follow as above stated. These nail expansions are usually employed in concrete or brick walls which are in themselves more or less porous, and when the wall is exposed to the weather moisture will be absorbed which will work into the axial bore of the anchor or expansion.

In the form of nail expansions now used it is impossible to get a secure hold between the work supported and the expansion. The work is usually made of iron. If any portion of the iron expansion now used contacts with the iron work, further driving in of the head of the nail by hammering does not make a tighter connection between the expansion and the work. On the contrary, when the cold iron of the expansion is hammered against the cold iron of the work there is a spring rebound, which will prevent a tight fit. This spring rebound will also cause a vibration of the fastening which has a tendency to loosen the expansion within the hole.

By my invention I protect to the maximum extent the nail when it is in the expansion so that moisture cannot readily reach and rust it. I protect the nail by forming a closed continuous axial bore which will prevent moisture working into the bore. Further I preferably employ some form of ductile member or flange which serves to close the exposed opening in the hole, as the member or flange is compressed by blows of the hammer on the head of the nail. This, in effect, closes or calks the exposed end of the axial bore preventing moisture working in under the head of the nail. By using a ductile member or flange I also protect the opening in the work so that no moisture can rust the sides of the opening and enlarge it, which in time would cause the loosening of the work on the wall. My ductile member or flange also performs the function of calking the opening in the exposed surface of the wall. My ductile member or flange is preferably integral with my ductile anchor or body member and permits of two different and successive expansions of the anchor or body member; first, at the inner end, by the end of the nail expanding the end of the anchor which is imbedded in the wall; and, second, by the head of the nail causing the ductile metal of the member or flange to flow or expand into the irregularities of the opening in the wall, forming thereby the double expansion.

This form of my invention is therefore a combined expansion and plug closing the opening in the wall. I believe myself to be the inventor of this broad feature and have made broad claims to it in my generic application filed herewith.

I have shown in the drawings different forms of my invention simply by way of example. It is of course to be understood that my invention is not to be confined to these particular forms.

I preferably form my anchor 1 of some ductile material as for example lead or an alloy. This anchor or body member is provided with an axial bore 2, Figs. 2 and 5, which is continuous from end to end and closed, except at the ends of the anchor. From the point 3 to approximately the point 4, Fig. 5, the bore is not tapered and is of sufficient diameter to permit the nail 5 to pass through it without compressing the material of the anchor or body member. From the point 4 to the point 6, the bore is provided with a tapering and preferably elliptical bore. From the point 6 to the point 7, the bore is preferably of one diameter but smaller than is the axial bore from the point 3 to the point 4, Fig. 5.

In using my nail expansion the anchor or body member 1 is passed through the hole 8 in the work 9 of any description, and then into the hole 10 within the wall or other suitable support 11. The nail 5 is then inserted as shown in Fig. 2, by driving the nail into the axial bore 2 so that its end 12 passes along the tapered elliptical portion of the bore extending from points 4 to 6, Fig. 5. The head 13 of the nail will then be brought into contact with the combined stop and member or flange 14 of the expansion as shown for example in Fig. 3. This will cause the body member or anchor to expand from approximately the points 15 and 17, Fig. 3, the head 13 then being flush with the combined stop and washer 14. This causes the main expansion to occur in the hole 10 back of the surface 16 of the wall or other suitable support 11. Up to this point there has been no appreciable expansion of the anchor or body member between the point 15 and the combined stop and member or flange 14, leaving a slight space 18 which is shown somewhat exaggerated in Fig. 3.

By further driving the head 13, after it has reached the position shown in Fig. 3, the nail 5 will be caused to move a little further along the axial bore 2 as shown in Fig. 4. At the same time the head 13 of the nail will compress and upset the combined stop and member or flange 14, as shown in Fig. 4, causing the ductile material of the member or flange and of the anchor to be compressed and flow so that it would firmly grip not only the nail 5 but also will fill up the opening 18 and cause the metal of the anchor to firmly grip the interior surface of the work 9, and also flow into all inequalities or voids in the adjacent surface of the hole 10 filling up the space 18.

In this form of my invention I provide the ductile anchor with different means to insure ready expansion of the anchor and yet not permit moisture to work into the axial bore 2 to rust the nail.

I have shown by way of example two sets of radial grooves which permit this function and also reduce the amount of metal necessary to form the ductile anchor and consequently reduce the cost of manufacture.

I provide the interior radial grooves 19, 19 which extend towards the periphery of the anchor leaving the webs 20, 20 so that no moisture can work into the axial bore. I also in this form of my invention provide exterior radial grooves 21, 21 which extend from the periphery towards the axial bore 2 leaving the webs 22, 22 so that no moisture can work through the exterior grooves into the axial bore. These two sets of interior and exterior grooves are staggered with relation to each other, and when only two of each are used they are preferably located 90° apart as shown more clearly in Fig. 6.

When the nail 5 is driven home as in Figs. 3 and 4 the elliptical portion of the axial bore is opened or enlarged, the grooves 21, 21 and 19, 19 also being enlarged as the diameter of the anchor is increased by the nail. No moisture however, can work into the axial bore 2, see Fig. 7.

The final position of the parts are shown in Fig. 4. It will be seen from this view that my invention is not only an expansion but also a plug in which the end of the hole 10 is plugged up after the main expansion has occurred back in the hole, as shown in Fig. 3. The degree to which the metal of the ductile anchor will flow depends upon the particular formation of the hole 10 in the wall. If a fair-sized hole has been drilled more metal will flow in the space 18 than if the hole had been drilled with greater precision; but in either case the flowing of the metal due to blows upon the head of the nail will fill all the voids in the adjacent sides of the hole 10, and also the hole 8 in the work 9, thereby calking the end of the hole 10 and preventing any moisture working into it.

In some cases I may form my ductile anchor or body member 23, Fig. 8, with a separate stop 24, letting the exposed end of the ductile anchor become the ductile member or flange 25. The head 13 of the nail 5 upsets the member or flange 25 as it is driven home.

I may also form my ductile anchor 26 with one or more separated stops 27 letting the exposed end of the anchor become the ductile member or flange 28.

Having thus described this invention in connection with illustrative embodiments thereof, to the details of which I do not desire to be limited, what is claimed as new and what is desired to secure by Letters Patent is set forth in the appended claims.

What I claim is:—

1. A nail anchor having a continuous unbroken axial bore extending from end to end of the anchor and provided with exterior grooves, and with interior grooves to permit the ready expansion of the anchor, said grooves alternating with relation to each other.

2. A ductile nail anchor having a continuous axial bore extending from end to end of the anchor and closed except at its ends, a portion of the axial bore being tapered, the anchor being provided with alternating radial grooves extending in opposite directions but not permitting moisture to penetrate into the axial bore.

3. The combination of a nail anchor having a continuous unbroken axial bore extending from end to end of the anchor and provided with exterior grooves, and with interior grooves to permit the ready expansion of the anchor, said grooves alternating with relation to each other and a nail to expand the anchor.

HENRY W. PLEISTER.

Witnesses:
MARY R. RYAN,
ELIZABETH J. ROTH.